Nov. 30, 1937. S. K. KOTOWSKI 2,100,512
GLASS SHEET SUPPORTING MEANS
Filed Sept. 6, 1935
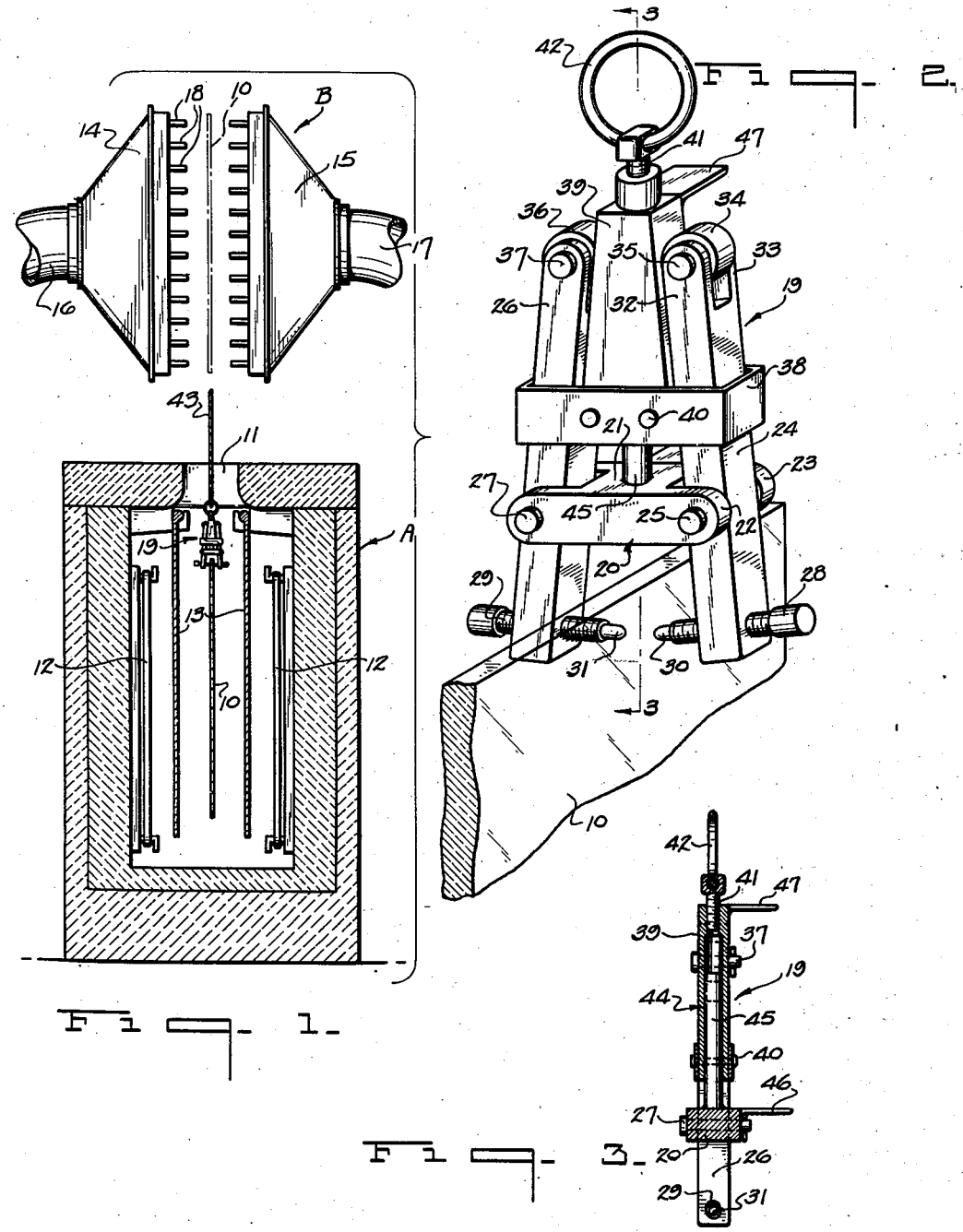
Inventor
STEPHEN K. KOTOWSKI.
By Frank Fraser
Attorney Patented Nov. 30, 1937

2,100,512

UNITED STATES PATENT OFFICE 2,100,512

GLASS SHEET SUPPORTING MEANS

Stephen K. Kotowski, Toledo, Ohio, assignor to Libbey-Owens-Ford Glass Company, Toledo, Ohio, a corporation of Ohio Application September 6, 1935, Serial No. 39,371

5 Claims. (Cl. 294—116)

The present invention relates broadly to the art of tempered sheet glass and more particularly to improvements in the means for supporting the glass sheets during the tempering thereof.

In the tempering of glass sheets according to one well known process, the sheets are first heated to approximately the point of softening of the glass and then suddenly chilled to place the outer surfaces of the said sheets under compression and the interiors thereof under tension. The treatment of glass sheets in this manner not only materially increases the mechanical strength of the glass but further modifies its breaking characteristics in that, when broken, the glass sheet will disintegrate into innumerable small and relatively harmless particles instead of breaking into large dangerous pieces or slivers as is the case with ordinary glass sheets.

In the practice of the above process, the glass sheets are ordinarily maintained in a vertical position during the treatment thereof, and it is customary to suspend the sheets from a plurality of relatively small tongs or hooks which engage opposite faces of said sheets near their upper edges.

This invention concerns the provision of a novel and improved type of tong or hook which will serve to effectively support the glass sheet during treatment without danger of dropping; which may be easily and quickly attached to and detached from the sheet; and which will cause less marring of the sheet upon softening of the glass than the hooks heretofore commonly employed.

Other objects and advantages of the invention will become more apparent during the course of the following description when taken in connection with the accompanying drawing.

In the drawing wherein like numerals are employed to designate like parts throughout the same, Fig. 1 is a view of one form of tempering apparatus illustrating the present invention in use, the means for heating the glass sheets being shown in section and the cooling means in elevation, Fig. 2 is a perspective view of the improved type of tong or hook provided by the present invention for supporting the glass sheet, and Fig. 3 is a vertical section taken substantially on line 3—3 of Fig. 2.

As brought out above, in the practice of one well known process for tempering glass sheets, the said sheets are first heated to approximately the point of softening of the glass and then suddenly chilled to place the outer surfaces of the sheets under compression and the interiors thereof under tension.

In the embodiment illustrated in the drawing, the means for heating the glass sheets comprises a furnace designated in its entirety by the letter A, while the means for subsequently chilling or cooling the sheets is designated generally by the letter B. The cooling means B is here shown as being arranged directly above the furnace A so that the glass sheet 10, after being heated within the furnace, can be transferred directly to the cooling means without any undue loss of heat and without being adversely affected by atmospheric conditions during the transfer.

The furnace A is preferably of the electrically heated type and is provided with a top opening 11 through which the glass sheets 10 to be treated may be inserted and removed. Any suitable covering can be used for the opening 11 as will be readily understood. For the purpose of heating the furnace, electrical heating elements 12 may be used in conjunction with baffle plates 13 and by means of any conventional indicating and control mechanism, the temperature of the furnace can be regulated to heat the glass sheet 10 to approximately its point of softening which is ordinarily in the neighborhood of 1250° F. for flat glass.

When the glass sheet has been heated to the desired temperature within the furnace, it is lifted therefrom through the top opening 11 and subjected immediately to the action of the cooling means B, said means comprising spaced blower heads 14 and 15 connected by means of flexible conduits 16 and 17 respectively to suitable blowers so that blasts of air can be directed simultaneously upon opposite surfaces of the glass sheet when brought into position between the said blower heads. Each blower head may be provided with a plurality of nipples 18 through which jets of air are directed against the sheet.

It will of course be appreciated that this invention is not limited either to the specific type of means herein disclosed for heating the glass sheets or the particular means disclosed for cooling the same.

According to the present invention, the glass sheet is supported during the treatment thereof by means of a plurality of relatively small hooks or tongs of novel and improved construction which engage opposite faces of the sheet closely adjacent its upper edge so that the said sheet is suspended therefrom in a vertical position. One of these hooks or tongs is designated in its entirety in Fig. 1 by the numeral 19 and is illustrated more in detail in Figs. 2 and 3. Each tong includes a horizontal, substantially H-shaped supporting member 20 comprising a body portion 21 formed at each end with spaced ears 22 and 23. Received between the ears at one end of the supporting member is a substantially vertical lever arm 24 pivotally mounted upon a transverse pin 25, while received between the ears at the opposite end of said supporting member is a similar lever arm 26 pivotally mounted upon a pin 27. The lever arms 24 and 26 extend upwardly a relatively greater distance beyond the pins 25 and 27 than beneath the same. In other words, the pivot points 25 and 27 are located closer to the lower ends of the lever arms than to the upper ends thereof.

Carried at the lower ends of the lever arms 24 and 26 are the sheet gripping elements 28 and 29 respectively comprising screws threaded through the said lever arms and having rounded inner ends 30 and 31 respectively which engage opposite faces of the glass sheet 10.

Each lever arm 24 and 26 is bifurcated at its upper end to provide the spaced legs 32 and 33 and mounted between the legs of the lever arm 24 is a freely rotatable roller 34 carried by pin 35, while received between the legs 32 and 33 of lever arm 26 is a freely rotatable roller 36 mounted upon pin 37.

Encircling the lever arms 24 and 26 above the supporting member 20 is a strap 38 and carried thereby is a vertical wedge-shaped block 39 tapering towards its upper end, the lower end of said block being received within the strap 38 and secured thereto by rivets or the like 40. Threaded within the upper end of the wedge block 39 is a screw 41 carrying a ring 42 to which is adapted to be fastened a cable 43 or other suitable supporting means. The wedge block 39 is also formed with a vertical opening 44 within which is received a vertical pin 45 carried by the body portion 21 of supporting member 20 and which pin serves to guide the wedge block during vertical movement thereof. Secured to the supporting member 20 is a horizontal tab 46 while a similar tab 47 is carried at the upper end of the wedge block 39. These tab members are provided to facilitate the attaching of the tong to the glass sheet by the operator as well as its detachment therefrom.

In the use of the tong described above, the sheet gripping elements 28 and 29 are first adjusted inwardly or outwardly depending upon the thickness of sheet to be supported. The operator then presses upon the tabs 46 and 47 to move them toward one another, whereupon the wedge block 39 will be forced downwardly and the supporting member 20 simultaneously upwardly until the strap 38 abuts the said supporting member. When the supporting member and strap are moved toward one another in this manner, the rollers 34 and 36 will be disposed opposite the upper narrower end of the wedge block, with the result that the upper ends of the lever arms 24 and 26 will be moved inwardly to cause the sheet gripping elements 28 and 29 to be moved away from one another. The gripping elements are then slipped over the upper edge of the glass sheet 10, the tabs 46 and 47 released, and the wedge block 39 pulled upwardly. As the wedge block moves upwardly, the rollers 34 and 36, riding along the inclined faces of the said wedge block, will force the upper ends of the lever arms 24 and 26 outwardly and the lower ends thereof inwardly to move the gripping elements 28 and 29 into engagement with the opposite faces of the glass sheet. When it is desired to remove the tong, it is simply necessary to again move the supporting member 20 and wedge block 39 toward one another, whereupon the upper ends of the lever arms will move inwardly and the lower ends thereof outwardly to release the sheet.

As brought out above, two or more tongs are ordinarily used to support each sheet of glass. It has been found that the type of tong herein provided will effectively support the glass sheet without any danger of dropping during the treatment thereof. Moreover, it has been found that this type of tong does not unduly mar the glass sheet and that the indentations formed in the sheet upon softening thereof are less noticeable than with tongs heretofore employed. Further, this tong is of sturdy, compact construction; will readily withstand the intense heat to which it is subjected during the heating of the glass; and may be readily and conveniently attached to or detached from the sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A tong for supporting a glass sheet in a vertical position during tempering, comprising a substantially horizontal supporting member, a pair of substantially vertical lever arms pivotally carried at the opposite ends of said supporting member, said arms extending above their pivotal points to a greater distance than beneath the same, adjustable sheet gripping elements carried at the lower ends of said lever arms, freely rotatable rollers carried at the upper ends of the said lever arms, a substantially vertical pin carried by the supporting member between the lever arms, a wedge-shaped member slidably mounted upon said pin and movable upwardly to rock the lever arms about their pivots to move the gripping elements inwardly into sheet engaging position, said rollers riding along the inclined faces of the wedge-shaped member, and a strap encircling said lever arms and to which the wedge-shaped member is secured.

2. A tong for supporting a glass sheet in a vertical position during tempering, comprising a substantially horizontal supporting member, a pair of substantially vertical lever arms pivotally carried at the opposite ends of said supporting member, sheet gripping elements carried at the lower ends of said lever arms, freely rotatable rollers carried at the upper ends of the lever arms, a strap encircling the lever arms above said supporting member, and a substantially triangular wedge-shaped member slidably mounted between the upper ends of the said lever arms and carried by said strap, said wedge-shaped member having relatively long inclined flat side faces and being movable upwardly relative to the lever arms to rock the same about their pivots to move the gripping elements into engagement with the sheet, the said rollers riding along the inclined flat faces of the wedge-shaped member upon upward movement thereof.

3. A tong for supporting a glass sheet in a vertical position during tempering, comprising a substantially horizontal supporting member, a pair of substantially vertical lever arms pivotally carried at the opposite ends of said supporting member, sheet gripping elements carried at the lower ends of said lever arms, freely rotatable rollers carried at the upper ends of the lever arms, a strap encircling the lever arms above said supporting member, a substantially triangular wedge-shaped member slidably mounted between the upper ends of the said lever arms and carried by said strap, said wedge-shaped member having relatively long inclined flat side faces and being movable upwardly relative to the lever arms to rock the same about their pivots to move the gripping elements into engagement with the sheet, the said rollers riding along the inclined flat faces of the wedge-shaped member upon upward movement thereof, and substantially horizontal tabs carried by said supporting member and wedge-shaped member and adapted to be forced toward one another to effect movement of the sheet gripping elements away from one another.

4. A tong for supporting a glass sheet in a vertical position during tempering, comprising a horizontal, substantially H-shaped supporting member, a pair of substantially vertical lever arms pivotally carried at the opposite ends of said supporting member, adjustable sheet gripping elements including screws threaded horizontally through the lower ends of said lever arms and having rounded inner ends adapted to engage opposite faces of the sheet, freely rotatable rollers carried at the upper ends of the lever arms, a strap encircling the lever arms above said supporting member, a substantially triangular wedge-shaped member slidably mounted between the upper ends of the said lever arms and carried by said strap, said wedge-shaped member having relatively long inclined flat side faces and being movable upwardly relative to the lever arms to rock the same about their pivots to move the gripping elements into engagement with the sheet, the said rollers riding along the inclined flat faces of the wedge-shaped member upon upward movement thereof, and a substantially vertical pin carried by said supporting member between the lever arms and upon which said wedge-shaped member is slidably mounted.

5. A tong for supporting a glass sheet in a vertical position during tempering, comprising a horizontal, substantially H-shaped supporting member, a pair of substantially vertical lever arms pivotally carried at the opposite ends of said supporting member, adjustable sheet gripping elements including screws threaded horizontally through the lower ends of said lever arms and having rounded inner ends adapted to engage opposite faces of the sheets, freely rotatable rollers carried at the upper ends of the lever arms, a strap encircling the lever arms above said supporting member, a substantially triangular wedge-shaped member slidably mounted between the upper ends of the said lever arms and carried by said strap, said wedge-shaped member having relatively long inclined flat side faces and being movable upwardly relative to the lever arms to rock the same about their pivots to move the gripping elements into engagement with the sheet, the said rollers riding along the inclined flat faces of the wedge-shaped member upon upward movement thereof, a substantially vertical pin carried by said supporting member between the lever arms and upon which said wedge-shaped member is slidably mounted, and substantially horizontal tabs carried by said supporting member and wedge-shaped member and adapted to be forced toward one another to effect movement of the sheet gripping elements away from one another.

STEPHEN K. KOTOWSKI.